Nov. 30, 1954  R. H. MILLER  2,695,747
MOTOR HOUSING AND MOTOR SUPPORTING RING
Filed May 22, 1950  2 Sheets-Sheet 1
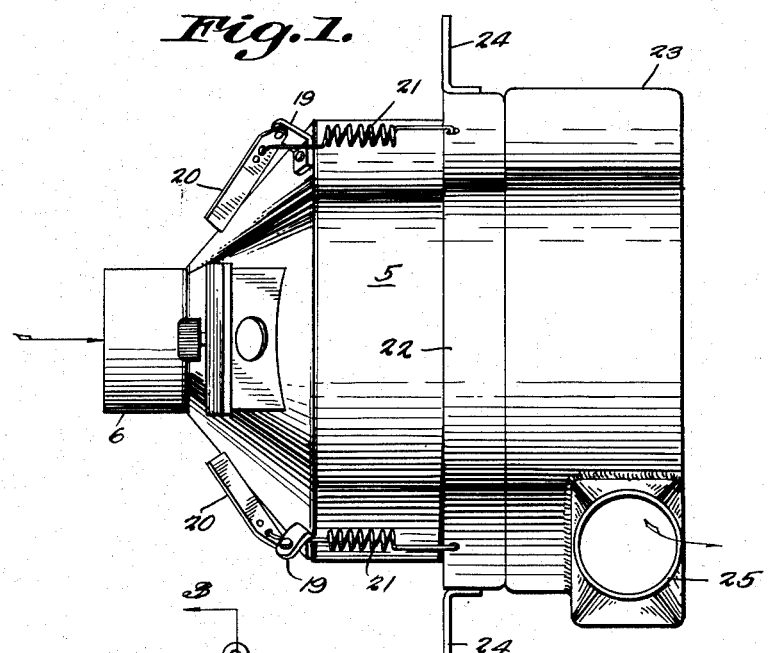
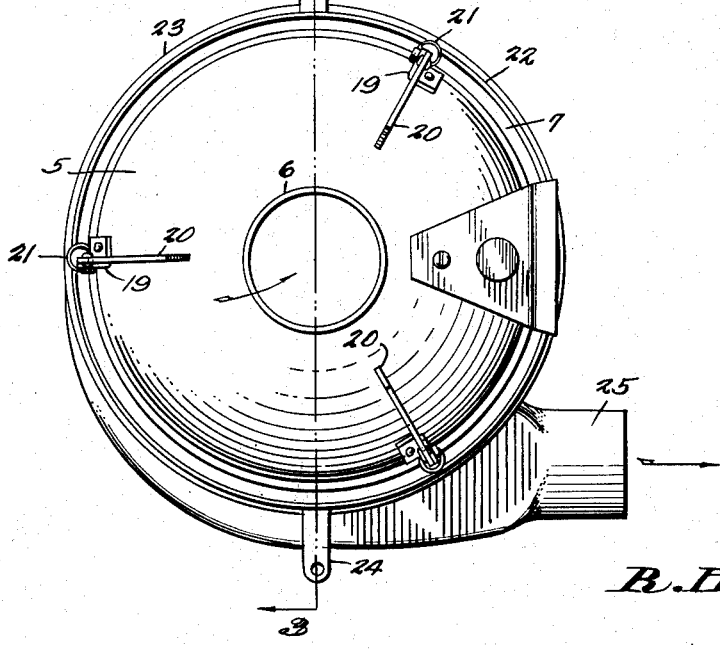
R. H. Miller
INVENTOR
BY C. A. Snow & Co.
ATTORNEYS.

Nov. 30, 1954  R. H. MILLER  2,695,747
MOTOR HOUSING AND MOTOR SUPPORTING RING
Filed May 22, 1950  2 Sheets-Sheet 2

R. H. Miller
INVENTOR
BY Charles A. Knowles
ATTORNEYS.

United States Patent Office 2,695,747
Patented Nov. 30, 1954

2,695,747

MOTOR HOUSING AND MOTOR SUPPORTING RING

Russell H. Miller, Hutchinson, Kans.

Application May 22, 1950, Serial No. 163,449

1 Claim. (Cl. 230—117)

This invention relates to fan blowers, and more particularly fan blowers operated by electric motors, the primary object of the invention being to provide a fan blower housing embodying separable sections, with means for readily securing the sections of the housing together to the end that the sections of the housing may be readily disconnected to service or repair the motor or blower.

An important object of the invention is to provide a housing of this character wherein the operation of the blower will be exceptionally quiet, the blower housing having means to cushion vibrations, eliminating noise.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is an elevational view illustrating a motor housing and support, constructed in accordance with the invention.

Fig. 2 is an end elevational view thereof.

Figure 3:
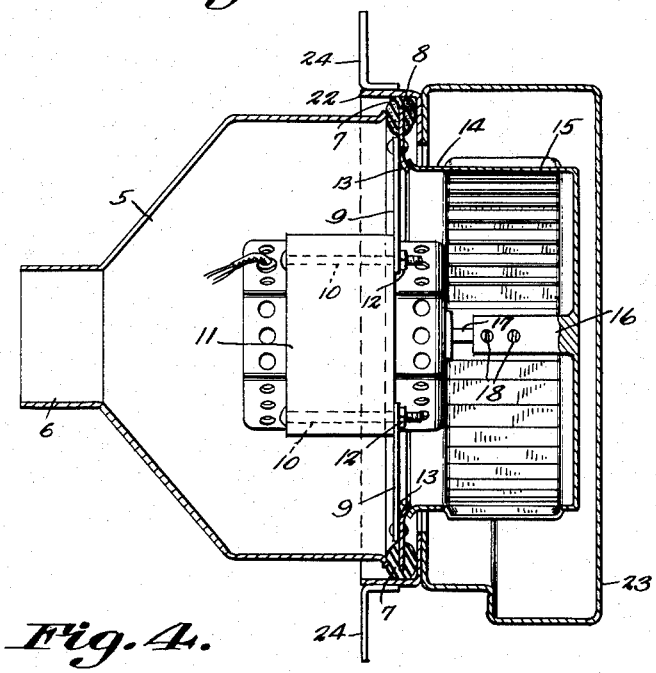
Fig. 3 is a longitudinal sectional view through the housing, illustrating the motor and fan blower support, taken on line 3—3 of Fig. 2.
Figure 4:
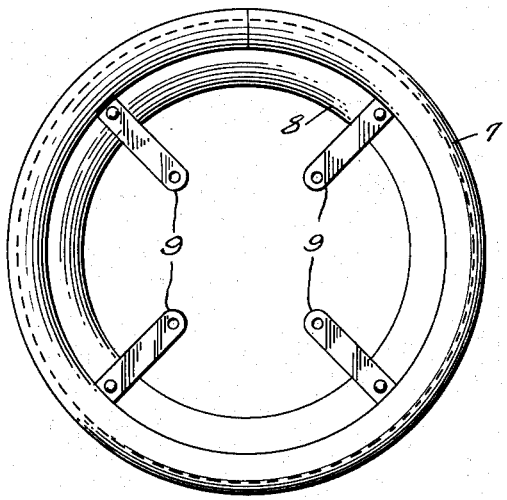
Fig. 4 is an end elevational view of the section of the housing in which the fan blower is supported.

Referring to the drawings in detail, the housing comprises the motor housing section 5 which has a reduced end 6 constituting the intake end of the housing. As shown by Fig. 1 of the drawings, the large or discharge end of the housing section 5 is rounded to fit against the rubber gasket 7 which is positioned over the outer edge of the supporting ring 8 to which the inwardly extended arms 9 are connected, the arms 9 being of lengths to extend to positions to receive the ends of the bolts 10 which pass through the casing of the motor 11, there being provided nuts 12 on the ends of the bolts 10 for securing the motor to the arms 9. As shown by Fig. 3 of the drawings, the inner edge of the supporting ring 8 is curved forwardly at 13 where it fits under the flared edge of the casing 14 forming a part of the blower 15.

The blower 15 is hollow, and is provided with a central post 16 which is secured to the motor shaft 17, by means of the screws 18, supporting the fan blower axially, with respect to the motor.

Figure 5:
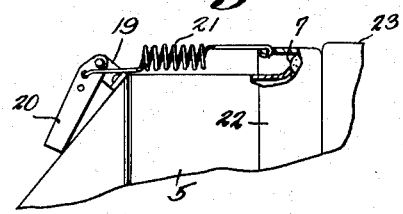
Fig. 5 is a fragmental elevational view illustrating the motor and fan blower sections of the housing as connected by the yieldable means forming the subject matter of the present invention.
Figure 6:
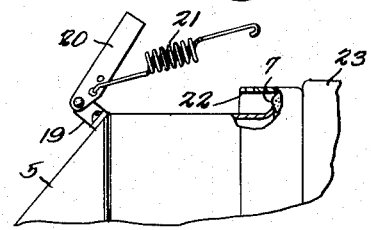
Fig. 6 is a fragmental elevational view of the flexible securing device, the flexible securing device being shown as disconnected from the fan blower housing.

Secured to the motor housing section 5, are ears 19 to which the levers 20 are pivotally connected, the levers 20 having openings in which one of the respective ends of the coiled spring 21 associated therewith, is secured, the point of connection between the coiled springs and their levers, being between the pivot points of the levers and free ends thereof, so that when the levers are swung from their upper or inactive positions, to their lowermost or active positions as shown by Fig. 5, the springs will be placed under tension.

These springs are formed with hooks which pass into openings formed in the collar 22 that in turn is secured to the inner or open end of the blower housing section 23, as by welding. Thus it will be seen that the blower housing section 23 will be securely held against the rubber gasket 7, to cushion the sections of the housing, against vibrations and insure a quiet operation of the blower at all times.

Securing arms 24 extend from the collar 22 and afford means whereby the motor housing section may be inserted in an opening of a supporting member such as a wall or the like and secured by means of bolts extended through the securing arms 24.

The reference character 25 indicates the outlet opening or conduit, to which a pipe may be connected to direct the air to a particular area.

From the foregoing it will be seen that due to the construction shown and described, it is an easy matter to swing the levers 20 to their uppermost positions, relieving the tension of the springs 21, to the end that the springs may be readily and easily disconnected from the blower housing section 23, allowing the blower housing section to be readily disconnected from the motor housing section, to dismantle, repair or service the blower or motor.

Having thus described the invention, what is claimed is:

In a housing for motor operated blowers, embodying separable intake and blower sections, one end of the intake section being fitted within one end of the blower section, a supporting ring clamped between the adjacent ends of said sections, a gasket secured over the edge of said supporting ring, supporting arms having one of their respective ends secured to said supporting ring, the other ends of said arms being secured to a motor of a blower, supporting said motor spaced from the walls of said housing, and means for securing the sections of said housing together.

References Cited in the file of this patent

UNITED STATES PATENTS

| Number | Name | Date |
|---|---|---|
| 1,206,615 | Templin | Nov. 28, 1916 |
| 1,249,692 | Upton | Dec. 11, 1917 |
| 1,418,238 | Cramer | May 30, 1922 |
| 1,979,027 | Engberg | Oct. 30, 1934 |
| 2,022,250 | Lofgren | Nov. 26, 1935 |
| 2,044,827 | Adams | June 23, 1936 |
| 2,114,780 | Juelson | Apr. 19, 1938 |
| 2,228,750 | Brock | Jan. 14, 1941 |
| 2,333,017 | Leathers | Oct. 26, 1943 |
| 2,336,716 | Clements | Dec. 14, 1943 |

FOREIGN PATENTS

| Number | Country | Date |
|---|---|---|
| 593,521 | Germany | Feb. 28, 1934 |